(12) United States Patent
Peleg et al.

(10) Patent No.: US 10,148,344 B2
(45) Date of Patent: Dec. 4, 2018

(54) ECHO CANCELLATION WITH TRANSMITTER-SIDE PRE-FILTERING

(71) Applicant: NOVELSAT LTD., Ra'anana (IL)

(72) Inventors: Dan Peleg, Sde Yitzhak (IL); Avihay Sadeh-Shirazi, Tel Aviv (IL); Avraham Freedman, Tel-Aviv (IL)

(73) Assignee: NOVELSAT LTD., Ra'anana (IL)

( * ) Notice: Subject to any disclaimer, the term of this patent is extended or adjusted under 35 U.S.C. 154(b) by 0 days.

(21) Appl. No.: 15/540,268

(22) PCT Filed: Jan. 4, 2016

(86) PCT No.: PCT/IB2016/050024
§ 371 (c)(1),
(2) Date: Jun. 28, 2017

(87) PCT Pub. No.: WO2016/113641
PCT Pub. Date: Jul. 21, 2016

(65) Prior Publication Data
US 2018/0006709 A1    Jan. 4, 2018

Related U.S. Application Data

(60) Provisional application No. 62/103,109, filed on Jan. 14, 2015.

(51) Int. Cl.
*H04B 7/185* (2006.01)
*H04B 1/10* (2006.01)
(Continued)

(52) U.S. Cl.
CPC ....... *H04B 7/18513* (2013.01); *H04B 1/0475* (2013.01); *H04B 1/10* (2013.01); *H04B 1/12* (2013.01)

(58) Field of Classification Search
CPC .................. H04B 1/0475; H04B 7/18513
See application file for complete search history.

(56) References Cited

U.S. PATENT DOCUMENTS 5,596,439 A    1/1997  Dankberg et al.
5,664,011 A    9/1997  Crochiere et al.
(Continued)

FOREIGN PATENT DOCUMENTS

CA    2721190 A1    10/2009
EP    1087559 B1    1/2010
(Continued)

OTHER PUBLICATIONS

Verdu, S, "Multiuser Detection," Cambridge University Press, chapter 7, pp. 344-393, year 1998.

*Primary Examiner* — Minh Trang T Nguyen
(74) *Attorney, Agent, or Firm* — D. Kligler IP Services Ltd.

(57) ABSTRACT

A method includes, in a transceiver (24), receiving from a repeater (32) a received signal, which includes a desired signal for reception and an undesired replica of a transmitted signal that was transmitted from the transceiver and retransmitted by the repeater. A local copy of the transmitted signal is generated in the transceiver. A filter response that, when applied to the transmitted signal before transmission, compensates for a difference in spectral response between the local copy and the undesired replica, is estimated in the transceiver. The undesired replica of the transmitted signal, which is received in the received signal, is matched with the local copy of the transmitted signal, by at least pre-filtering the transmitted signal before transmission with the estimated filter response. Interference caused by the undesired replica to the desired signal is canceled, by combining the local copy and the received signal.

18 Claims, 5 Drawing Sheets

(51) Int. Cl.
*H04B 1/12* (2006.01)
*H04B 1/04* (2006.01)

(56) References Cited

U.S. PATENT DOCUMENTS

| | | | |
|---|---|---|---|
| 6,011,952 A | 1/2000 | Dankberg et al. | |
| 6,031,882 A | 2/2000 | Enge et al. | |
| 6,157,811 A | 12/2000 | Dent | |
| 6,256,486 B1 | 7/2001 | Barany et al. | |
| 6,418,161 B1 | 7/2002 | Shively et al. | |
| 6,466,958 B1 | 10/2002 | Van Wechel et al. | |
| 6,597,750 B1 | 7/2003 | Knutson et al. | |
| 6,675,307 B1 | 1/2004 | Heitkamp et al. | |
| 6,725,017 B2 | 4/2004 | Blount et al. | |
| 6,859,641 B2 | 2/2005 | Collins et al. | |
| 6,975,582 B1 | 12/2005 | Karabinis et al. | |
| 6,996,164 B1 | 2/2006 | Blount et al. | |
| 7,113,557 B2 | 9/2006 | Kaku et al. | |
| 7,228,104 B2 | 6/2007 | Collins et al. | |
| 7,522,877 B1 | 4/2009 | Avellan et al. | |
| 7,782,935 B1 | 8/2010 | Wong et al. | |
| 7,991,373 B2 | 8/2011 | Miller et al. | |
| 8,446,936 B2 | 5/2013 | Kim et al. | |
| 8,644,866 B2 | 2/2014 | Wajcer et al. | |
| 2001/0038674 A1* | 11/2001 | Trans | H04B 1/00 375/355 |
| 2002/0098802 A1 | 7/2002 | Karabinis | |
| 2002/0110206 A1 | 8/2002 | Becker et al. | |
| 2003/0054760 A1 | 3/2003 | Karabinis | |
| 2003/0054762 A1 | 3/2003 | Karabinis | |
| 2003/0063577 A1 | 4/2003 | Hayward | |
| 2003/0165233 A1 | 9/2003 | Veitch et al. | |
| 2003/0185176 A1 | 10/2003 | Lusky et al. | |
| 2003/0224723 A1 | 12/2003 | Sun et al. | |
| 2003/0235294 A1 | 12/2003 | Dyba et al. | |
| 2004/0042561 A1 | 3/2004 | Ho et al. | |
| 2004/0042569 A1 | 3/2004 | Casabona et al. | |
| 2004/0105403 A1 | 6/2004 | Lin et al. | |
| 2005/0190870 A1 | 9/2005 | Blount et al. | |
| 2005/0220043 A1 | 10/2005 | Handel et al. | |
| 2006/0023821 A1 | 2/2006 | Barnette et al. | |
| 2006/0040611 A1 | 2/2006 | Ding et al. | |
| 2006/0222113 A1 | 10/2006 | Harrison | |
| 2007/0066226 A1 | 3/2007 | Cleveland et al. | |
| 2007/0211794 A1 | 9/2007 | Dabiri et al. | |
| 2008/0137763 A1 | 6/2008 | Waters et al. | |
| 2009/0102706 A1 | 4/2009 | Goldblatt et al. | |
| 2009/0274202 A1 | 11/2009 | Hanke et al. | |
| 2010/0056192 A1 | 3/2010 | Lachman et al. | |
| 2010/0194987 A1 | 8/2010 | Kim et al. | |
| 2010/0285735 A1 | 11/2010 | Gore et al. | |
| 2010/0285738 A1 | 11/2010 | Howard et al. | |
| 2011/0116531 A1 | 5/2011 | Gore et al. | |
| 2011/0261863 A1 | 10/2011 | Chandra et al. | |
| 2011/0311007 A1 | 12/2011 | Nuutinen et al. | |
| 2012/0115412 A1 | 5/2012 | Gainey et al. | |
| 2012/0282872 A1* | 11/2012 | Banwell | H04B 1/58 455/269 |
| 2013/0083917 A1 | 4/2013 | Peng et al. | |
| 2013/0089021 A1 | 4/2013 | Gaal et al. | |
| 2013/0343437 A1 | 12/2013 | Li et al. | |
| 2014/0004794 A1 | 1/2014 | Contaldo et al. | |
| 2014/0079163 A1 | 3/2014 | Miller et al. | |
| 2015/0244450 A1 | 8/2015 | Wajcer et al. | |

FOREIGN PATENT DOCUMENTS

| | | |
|---|---|---|
| EP | 2445122 A1 | 4/2012 |
| WO | 2007078032 A1 | 7/2007 |
| WO | 2012055469 A1 | 5/2012 |

\* cited by examiner

ECHO CANCELLATION WITH TRANSMITTER-SIDE PRE-FILTERING

CROSS-REFERENCE TO RELATED APPLICATIONS

This application claims the benefit of U.S. Provisional Patent Application 62/103,109, filed Jan. 14, 2015, whose disclosure is incorporated herein by reference.

FIELD OF THE INVENTION

The present invention relates generally to wireless communication, and particularly to methods and systems for echo cancellation in communication systems.

BACKGROUND OF THE INVENTION

Wireless communication receivers are often subject to interference that degrades reception performance. Various techniques for canceling interference and other channel impairments are known in the art. For example, U.S. Pat. Nos. 5,596,439 and 6,011,952, whose disclosures are incorporated herein by reference, describe techniques in which a source transmitted signal is cancelled at a receiver associated with the transmitter, so that the desired received signal can be extracted from a composite received signal, the composite received signal consisting of the source signal relayed from the relay station along with the desired received signal from the other user in the pair, plus additive noise.

U.S. Pat. No. 6,725,017, whose disclosure is incorporated herein by reference, describes multi-channel self-interference cancellation in relayed electromagnetic communication between a first device and one or more other devices on one or more shared frequency channels. Specifically, near signals are generated at the first device and transmitted to a relay station. A composite signal is received at the first device from the relay station containing relayed versions of the near signals and relayed versions of remote signals transmitted from the one or more other devices, the composite signal having frequency channels including the one or more shared frequency channels, each shared frequency channel occupied by at least one of the relayed near signals and one of the relayed remote signals. One or more cancellation signals are selectively generated, each having a frequency band corresponding to one of the shared frequency channels. The cancellation signals are combined with the composite signal to produce a desired signal representing the relayed remote signals.

U.S. Pat. No. 6,859,641, whose disclosure is incorporated herein by reference, describes an adaptive interference canceller for canceling an interfering signal corresponding to a delayed, frequency translated, amplitude and phase offset version of a transmitted signal contained in a composite received signal relayed through a relay system such as a satellite transponder. The canceller digitally down-converts the received signal and a local replica of the transmitted signal from IF to baseband, applies a variable delay and frequency compensation to the replica as a coarse delay and frequency correction, and tracks fine delay, amplitude and phase differences using an adaptive finite impulse response filter to generate a cancellation signal corresponding to the delayed and frequency shifted version. A minimum output power process produces an error signal that drives the variable delay and adaptive filter to minimize the power in the signal of interest to maximize cancellation of the interfering signal.

U.S. Pat. No. 6,907,093, whose disclosure is incorporated herein by reference, describes self-interference cancellation in two-way relayed electromagnetic communication between a first device and a second device through a relay station, wherein a representation of a relayed composite signal above baseband and a representation of a locally modulated interface signal above baseband interact to effect the self-interference cancellation. Specifically, the composite signal, which contains a relayed version of the locally modulated (near) signal from the first device and a relayed version of a modulated far signal from the second device, is received at the first device from the relay station. The composite signal is then provided in a representation as a first interface signal at a first frequency at or above baseband to a canceller module of the first device and a representation of the modulated near signal at a second frequency above baseband is provided as a second interface signal to the canceller module. Part of the relayed version of the modulated near signal is canceled from the representation of the composite signal using the representation of the modulated near signal as provided to the canceller module to produce a third interface signal as output at a third frequency at or above baseband.

U.S. Pat. No. 6,996,164, whose disclosure is incorporated herein by reference, describes self-interference cancellation in two-way relayed communications, by creating models of up-converter and down-converter imperfections and then compensating for those imperfections before self-interference cancellation processing. The model includes compensation for phase offset, for amplitude imbalance and for leakage in the mixers.

U.S. Pat. No. 7,228,104, whose disclosure is incorporated herein by reference, describes an adaptive interference canceller for canceling an interfering signal corresponding to a delayed, frequency translated, amplitude and phase offset version of a transmitted signal contained in a composite received signal relayed through a relay system such as a satellite transponder. The canceller digitally down-converts the received signal and a local replica of the transmitted signal from IF to baseband, applies a variable delay and frequency compensation to the replica as a coarse delay and frequency correction, and tracks fine delay, amplitude and phase differences using an adaptive finite impulse response filter to generate a cancellation signal corresponding to the delayed and frequency shifted version. A minimum output power process produces an error signal that drives the variable delay and adaptive filter to minimize the power in the signal of interest to maximize cancellation of the interfering signal.

U.S. Pat. No. 7,349,505, whose disclosure is incorporated herein by reference, describes techniques for providing self-interference cancellation in two-way relayed electromagnetic communication between a first and a second device through a relay station, involving retrofitting existing equipment comprising a transmitter system and a receiver system at the first device by adding a canceller module, providing a version of a modulated near signal as a first non-baseband interface signal from the transmitter system to the canceller module, providing a version of a composite signal as a second non-baseband interface signal from the receiver system to the canceller module, generating a cancellation signal at the canceller module corresponding to a relayed version of the modulated near signal, using the first and the second non-baseband interface signals, applying the cancellation signal at the canceller module to a version of the second non-baseband interface signal, to produce a cancellation-processed signal as a third non-baseband interface signal provided to the receiver system.

U.S. Pat. No. 7,522,877, whose disclosure is incorporated herein by reference, describes a method for reduction of echo noise in satellite communications, including receiving an aggregate signal from multiple remote stations, where the aggregate signal includes a transmit signal, whose bandwidth is in the range of 0.1 MHz to 66 MHz, is previously sent from a hub to the multiple receiving stations, computing a scaled, delayed and distorted replica of the transmit signal and using the replica to compensate for satellite transponder nonlinearities and reduce echo noise interference from a received aggregate signal received by the hub from the multiple remote stations.

U.S. Pat. No. 7,991,373, whose disclosure is incorporated herein by reference, describes a signal filtering system for a frequency reuse system. A first implementation includes a downlink baseband signal, coupled to a downlink bandwidth filter, including a composite received signal including at least an interfering signal and a signal of interest, each having a composite bandwidth, a first bandwidth, and a second bandwidth, respectively. An uplink baseband signal may be included, coupled to an uplink bandwidth filter, having a replica of the interfering signal corresponding with the interfering signal and having an interference bandwidth. A baseband processing module may be coupled with the downlink bandwidth filter and the uplink bandwidth filter and may be configured to cancel the interfering signal from the composite received signal using the replica of the interfering signal. The downlink bandwidth filter may be configured to reduce the composite bandwidth and the uplink bandwidth filter may be configured to reduce the interference bandwidth.

PCT International Publication WO 2014/076606, whose disclosure is incorporated herein by reference, describes a method that includes, in a transceiver, receiving from a repeater a received signal that includes a desired signal for reception and an undesired replica of a transmitted signal that was transmitted from the transceiver and retransmitted by the repeater. A local copy of the transmitted signal is generated in the transceiver. The local copy is matched with the undesired replica of the transmitted signal in the received signal, by adapting the received signal while retaining the local copy non-adaptive. An interference caused by the undesired replica to the desired signal is canceled, by subtracting the local copy from the adapted received signal.

SUMMARY OF THE INVENTION

An embodiment that is described herein provides a method including, in a transceiver, receiving from a repeater a received signal, which includes a desired signal for reception and an undesired replica of a transmitted signal that was transmitted from the transceiver and retransmitted by the repeater. A local copy of the transmitted signal is generated in the transceiver. A filter response that, when applied to the transmitted signal before transmission, compensates for a difference in spectral response between (i) the local copy of the transmitted signal and (ii) the undesired replica of the transmitted signal, is estimated in the transceiver. The undesired replica of the transmitted signal, which is received in the received signal, is matched with the local copy of the transmitted signal, by at least pre-filtering the transmitted signal before transmission with the estimated filter response. Interference caused by the undesired replica to the desired signal is canceled, by combining the local copy and the received signal.

In some embodiments, the repeater includes a satellite. In a disclosed embodiment, estimating the filter response includes estimating frequency-dependent variations in phase and gain between (i) the local copy of the transmitted signal and (ii) the undesired replica of the transmitted signal, across a given bandwidth. In another embodiment, estimating the filter response includes running an iterative Least Means Square (LMS) process that converges to the filter response.

In yet another embodiment, estimation of the filter response is performed in a demodulator of the transceiver, pre-filtering the transmitted signal with the estimated filter response is performed in a modulator of the transceiver, and the estimated filter response is transferred from the demodulator to the modulator over a local interface in the transceiver.

In some embodiments, matching the undesired replica with the local copy further includes compensating for one or more impairments selected from a group of impairments consisting of: a timing offset between the received signal and the local copy of the transmitted signal; a frequency offset between the received signal and the local copy of the transmitted signal; a frequency-independent gain difference between the received signal and the local copy of the transmitted signal; and a frequency-independent phase difference between the received signal and the local copy of the transmitted signal.

In an example embodiment, compensating for the impairments includes correcting at least one of the impairments by adapting the received signal. Additionally or alternatively, compensating for the impairments includes correcting at least one of the impairments by adapting the local copy of the transmitted signal. In an example embodiment, compensating for the impairments is performed without adapting the local copy of the transmitted signal. In some embodiments, the received signal and the transmitted signal occupy overlapping spectra.

There is additionally provided, in accordance with an embodiment of the present invention, a communication transceiver including a front end and a modem. The front end is configured to exchange signals with a repeater. The modem is configured to receive from the repeater a received signal, which includes a desired signal for reception and an undesired replica of a transmitted signal that was transmitted from the transceiver and retransmitted by the repeater, to generate a local copy of the transmitted signal, to estimate a filter response that, when applied to the transmitted signal before transmission, compensates for a difference in spectral response between (i) the local copy of the transmitted signal and (ii) the undesired replica of the transmitted signal, to match the undesired replica of the transmitted signal, which is received in the received signal, with the local copy of the transmitted signal, by at least pre-filtering the transmitted signal before transmission with the estimated filter response, and to cancel an interference caused by the undesired replica to the desired signal, by combining the local copy and the received signal.

The present invention will be more fully understood from the following detailed description of the embodiments thereof, taken together with the drawings in which:

DETAILED DESCRIPTION OF EMBODIMENTS

Overview

Figure 1:
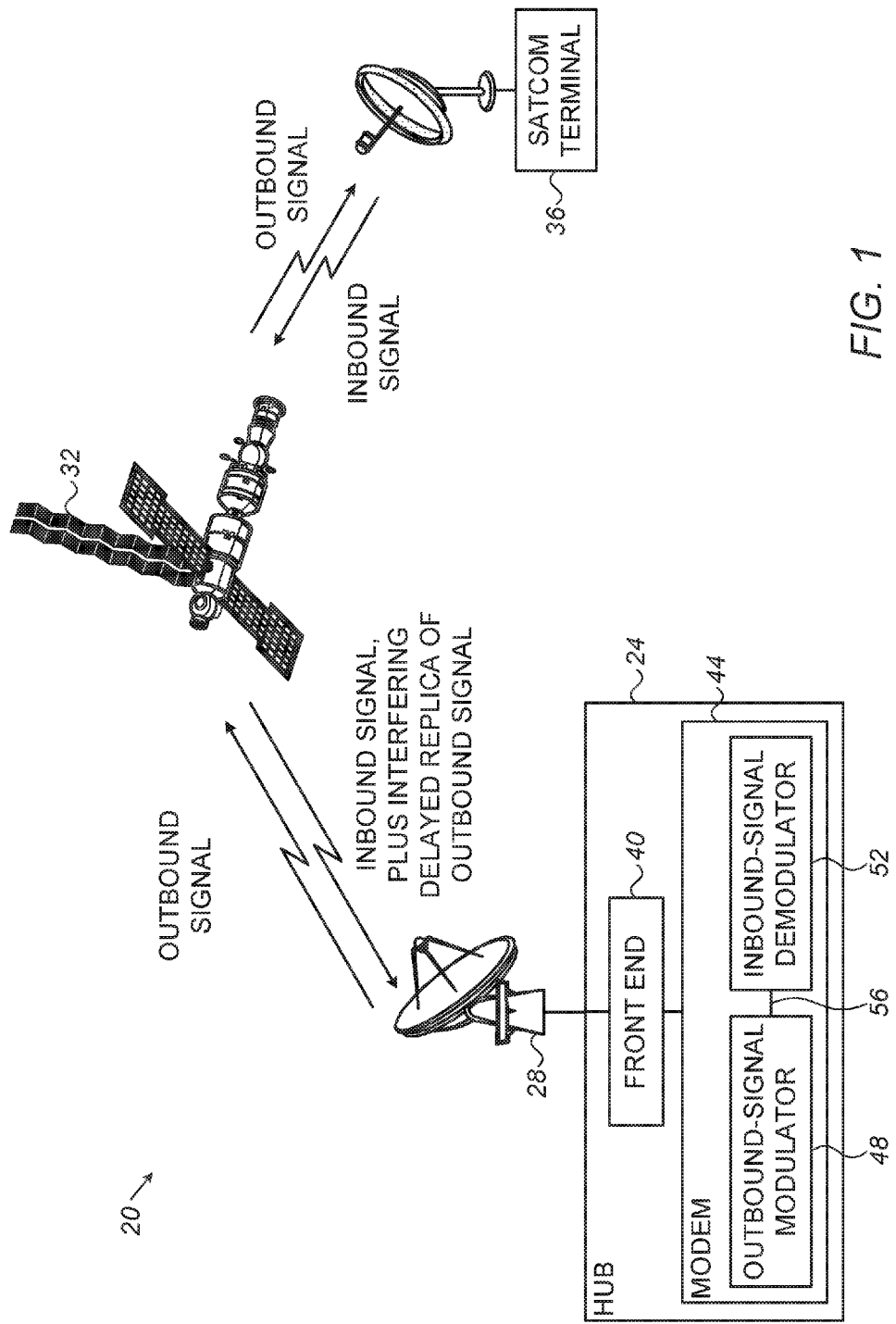
FIG. 1 is a block diagram that schematically illustrates a satellite communication system, in accordance with an embodiment of the present invention.

In some communication systems, a replica of a transmitted signal may cause interference to signal reception. Consider, for example, a satellite communication transceiver that receives a received signal from a satellite and transmits a transmitted signal to the satellite. In some scenarios, a delayed and distorted replica of the transmitted signal, which is retransmitted by the satellite, may be received by the terminal and interfere with reception. In other words, the received signal may comprise a desired signal plus an undesired delayed replica of the transmitted signal. An undesired replica of this sort is sometimes referred to as "echo." Such scenarios may occur, for example, when both directions of the satellite link reuse the same frequency band. Similar scenarios may occur in other kinds of communication systems, as well.

Embodiments of the present invention that are described herein provide improved methods and systems for mitigating interference such the above-described echoes. In some embodiments, the transceiver generates a delayed local copy of the transmitted signal. The transceiver matches the undesired replica of the transmitted signal, which is received in the received signal, with the local copy of the transmitted signal, and combines the local copy and the received signal. With accurate matching, the interference level in the combined signal can be reduced considerably.

In order to achieve deep interference cancellation, it is typically necessary to match the undesired replica of the transmitted signal with the local copy of the transmitted signal in frequency and delay, as well as in spectral response (i.e., in amplitude and phase across the signal bandwidth). In some disclosed embodiments, the transceiver compensates for the latter differences in spectral response by pre-filtering the transmitted signal prior to transmission.

In some embodiments, the transceiver adaptively estimates a filter response that, when applied to the transmitted signal before transmission, compensates for the difference in spectral response between the local copy of the transmitted signal and the undesired replica of the transmitted signal. The transceiver pre-filters the transmitted signal with this filter.

Typically, the transmitter-side pre-filtering compensates for the frequency-dependent variations in gain and phase between the local copy of the transmitted signal and the undesired replica of the transmitted signal, across the signal bandwidth. In some embodiments, an additional broadband correction of gain and phase, i.e., a single complex-gain correction that is independent of frequency, is applied at the demodulator.

The undesired replica of such a pre-filtered transmitted signal, when later received as part of the received signal, is accurately matched in spectral response to the local copy of the transmitted signal. As a result, combining the received signal with the delayed local copy reduces the interference to a very low level and over a wide bandwidth.

Compensating for differences in spectral response by pre-filtering on the transmitter side has important advantages over compensation on the receiver side. For example, transmitter-side pre-filtering eliminates noise enhancement that often occurs in receiver-side equalization.

The disclosed techniques can be used in various kinds of satellite communication transceivers, such as in a hub or user station. Although the embodiments described herein refer mainly to satellite communication, the disclosed echo cancellation techniques are similarly applicable to other kinds of communication systems that use repeaters. Thus, the term "repeater" is used herein in a broad sense, and includes satellites as well as other kinds of repeaters, such as airborne or terrestrial repeaters.

System Description

FIG. 1 is a block diagram that schematically illustrates a satellite communication system 20, in accordance with an embodiment of the present invention. System 20 comprises a hub 24 that communicates using an antenna 28, via a satellite 32, with one or more satellite communication (SATCOM) terminals 36. For the sake of clarity, FIG. 1 shows only a single terminal, although real-life systems may comprise multiple terminals 36 served by the same hub.

The description of FIG. 1 refers to echo cancellation in hub 24. This choice, however, is made purely by way of example. In alternative embodiments, the disclosed techniques can be used for echo cancellation in terminal 36, or in any other suitable type of transceiver. Thus, in the present context, hub 24 and terminal 36 are regarded as examples of transceivers (transmitters-receivers) in which the disclosed techniques can be implemented.

System 20 may operate in accordance with any suitable communication standard or protocol, such as the various Digital Video Broadcast (DVB) protocols. Although the embodiments described herein refer mainly to satellite communication, the disclosed techniques can be used in various terrestrial communication systems, as well.

In the present example, the communication direction from hub 24 to terminal 36 is referred to as outbound, and the communication direction from the terminal to the hub is referred to as inbound. This terminology, however, is used purely for the sake of clarity. Any other suitable terminology, e.g., forward-reverse or uplink-downlink, can also be used.

In the outbound direction, hub 24 transmits an outbound signal to satellite 32, and the satellite retransmits the outbound signal to terminal 36. In the inbound direction, terminal 36 transmits an inbound signal toward satellite 32, and the satellite retransmits the inbound signal to hub 24. In both directions, retransmission by the satellite may or may not involve a change of frequency.

In some practical scenarios, the signal received at hub 24 comprises a desired signal (the inbound signal retransmitted by satellite 32) and an undesired signal (a delayed replica of the outbound signal that is retransmitted by satellite 32 toward terminal 36 but also received by hub 24). The undesired signal is also referred to as "echo." In addition to being delayed, the delayed replica of the outbound signal is usually also distorted relative to the outbound signal that is transmitted from hub 24. In addition to delay, the replica of the outbound signal may differ from the outbound signal, for example, in frequency and spectral response (e.g., phase and amplitude across the signal bandwidth).

Interference due to echo is particularly severe when the outbound and inbound signals share the same frequency band (i.e., occupy overlapping spectra), and/or when the satellite transmission lobes are wide or omnidirectional. Nevertheless, this sort of interference may exist and should be mitigated in other scenarios, as well. In some embodiments, hub 24 carries out an echo cancellation process that cancels the above-described interference. This process is explained in detail below.

In the present example, hub 24 comprises a front end 40 and a modem (modulator-demodulator) 44. Front end 40 down-converts the received signal from Radio Frequency (RF) to baseband or to Intermediate Frequency (IF), and up-converts the transmitted signal from baseband or from IF to RF. Modem 44 carries out the various signal processing functions of the hub, and in particular echo cancellation. Modem 44 comprises a modulator 48 that generates and modulates the outbound signal for transmission, and a demodulator 52 that demodulates and reconstructs the received inbound signal. A local, e.g., wired, interface 56 is used for coordinating echo cancellation between modulator 48 and demodulator 52, as will be explained below.

As noted above, although the embodiment of FIG. 1 refers to echo cancellation in hub 24, the disclosed techniques can be used in other suitable communication equipment, for example in a modem of terminal 36. Moreover, the disclosed techniques are not limited to satellite communication and may be used in various other applications, as well, for example in communication systems that use other types of airborne or terrestrial repeaters.

Echo Cancellation Using Transmitter-Side Pre-Filtering

As noted above, the signal received at hub 24 comprises (i) a desired signal (the inbound signal) and (ii) an undesired signal (a delayed replica of the outbound signal that is retransmitted by satellite 32). In some embodiments, modem 44 cancels the interference caused by the undesired signal by adapting both the outbound signal in modulator 48 before transmission, and the received signal in demodulator 52.

The adaptation aims to match the received interfering replica of the outbound signal and the delayed local copy of the outbound signal. Matching is performed in spectral response (i.e., in amplitude and phase response across the signal bandwidth), and possibly also in frequency and/or timing (i.e., delay). After matching, the two signals are combined (e.g., subtracted from one another) so as to cancel the interference. With accurate matching, the combining reduces the echo (the interfering replica of the outbound signal) in the received signal considerably, e.g., by 20-30 dB.

In the disclosed embodiments, compensation for the differences in spectral response is performed by pre-filtering the outbound signal in modulator 48 prior to transmission.

Figure 2:
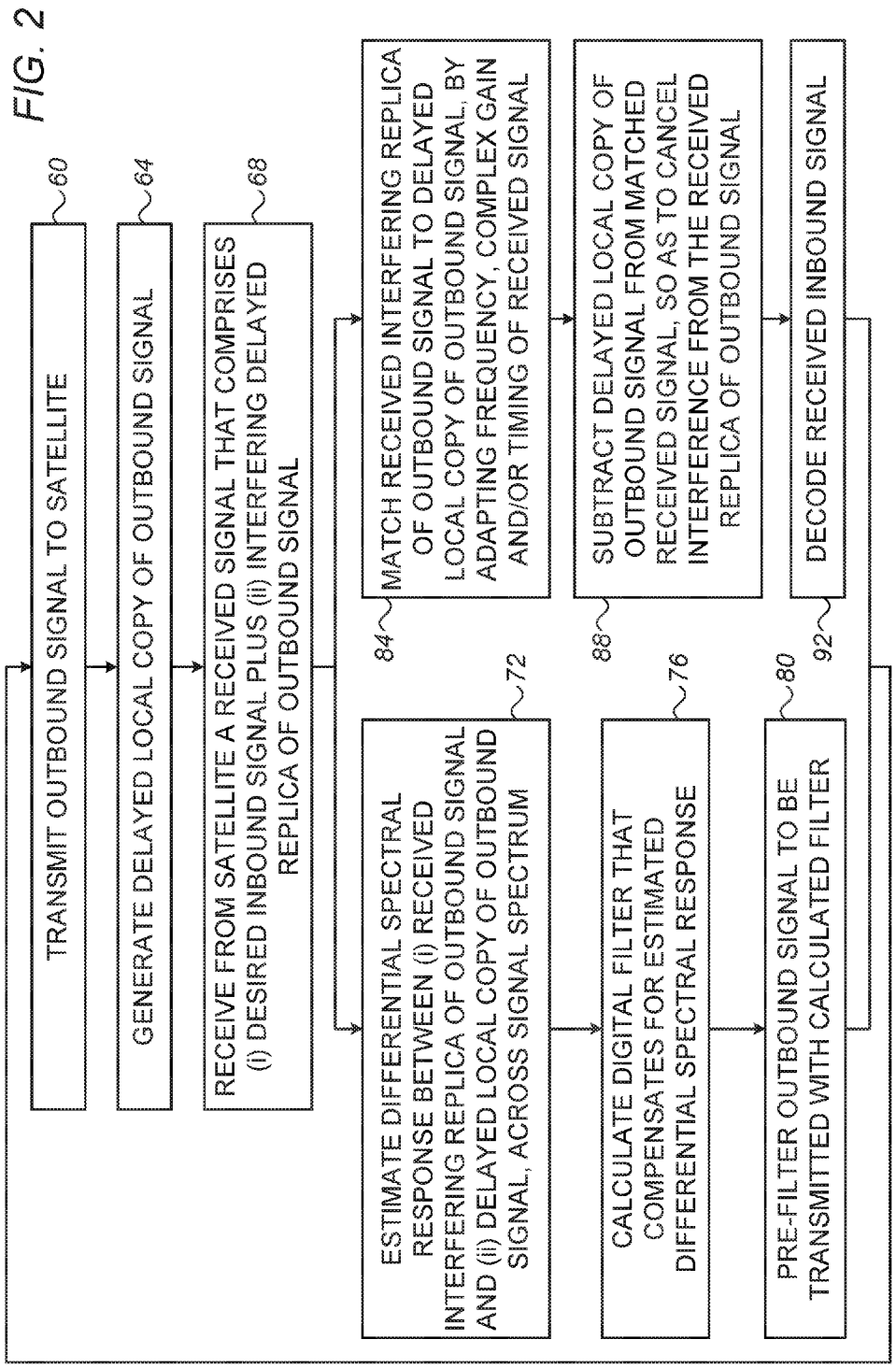
FIG. 2 is a flow chart that schematically illustrates a method for echo cancellation in a satellite communication system using transmitter-side pre-filtering, in accordance with an embodiment of the present invention.

FIG. 2 is a flow chart that schematically illustrates a method for echo cancellation using transmitter-side pre-filtering, in accordance with an embodiment of the present invention. The method begins with hub 24 transmitting an outbound signal to satellite 32, at a transmission step 60. The satellite retransmits the outbound signal to terminal 36.

Modem 44 of hub 24 generates a delayed local copy of the outbound (transmitted) signal, at a local copy generation step 64. The modem typically generates the local copy digitally, e.g., by delaying the stream of digital samples from which the outbound signal is produced. The delay applied to the local copy aims to approximate the delay (seen at hub 24) between the transmitted outbound signal and the undesired replica of the outbound signal that is subsequently received from satellite 32. This delay is on the order of the round-trip delay between hub 24 and satellite 32, plus some processing delay.

Hub 24 receives from satellite 32 a received signal, at a reception step 68. The received signal comprises a desired signal (the inbound signal originating from terminal 36) and an undesired signal (a replica of the transmitted outbound signal that is retransmitted by the satellite).

Modem 44 carries out, typically in parallel, two adaptation processes for matching the undesired received replica of the transmitted signal with the delayed local copy of the transmitted signal. One process, seen on the left-hand-side of FIG. 2, compensates for the differences in linear spectral response between the two signals across the signal bandwidth. The second process, seen on the right-hand-side of the figure, matches the other parameters of the two signals, e.g., frequency, delay and complex gain.

At a response estimation step 72, demodulator 52 estimates the differences in spectral response (gain and phase) between the undesired received replica of the transmitted signal and the delayed local copy of the transmitted signal, across the signal bandwidth.

At a filter calculation step 76, demodulator 52 calculates a digital filter response that, if applied to the transmitted signal in modulator 48 before transmission, would compensate for the differences in spectral response estimated at step 72. Demodulator 52 transfers the calculated filter response to modulator 48 over local interface 56.

At a transmitter-side pre-filtering step 80, modulator 48 pre-filters the transmitted signal with the filter response transferred from demodulator 52, and then transmits the pre-filtered signal to satellite 32. The method loops back to transmission step 60, in which hub 24 transmits the pre-filtered outbound signal to satellite 32.

In an embodiment, the filter whose response is calculated at step 76 comprises an adaptive digital Finite Impulse Response (FIR) filter located in the digital signal path of modulator 48. In this embodiment, at step 72 demodulator 52 calculates a set of coefficients for this FIR filter, having the desired response. Demodulator 52 then transfers the set of coefficients to modulator 48 over interface 56, and modulator 48 configures the adaptive digital FIR filter with these coefficients.

It is emphasized that the transfer of the filter response from demodulator 52 to modulator 48 is local, over local interface 56 within modem 44 of hub 24, and does not involve transmitting of the filter response over the air.

At a receiver-side signal matching step 84, demodulator 52 adapts the delay (timing), frequency and complex gain of the received signal. The adaptation aims to coherently match the respective frequencies, delays and complex gains between (i) the undesired replica of the transmitted signal received as part of the received signals, and (ii) the delayed local copy of the transmitted signal.

Note that the receiver-side matching at step 84 is broadband, i.e., non-frequency-selective, in the sense that the same frequency, timing and complex gain values apply to the entire signal bandwidth. Frequency-dependent variations in gain and phase are compensated for by the transmitter-side pre-filtering of steps 72-80.

At a signal combining step 88, demodulator 52 combines the adapted received signal with the delayed local copy of the transmitted signal. In the present example, the demodulator subtracts the two signals from one another. Due to the broadband receiver-side matching (step 84) and the frequency-selective transmitter-side pre-filtering (steps 72-80), the resulting combined signal is substantially free of echo.

Demodulator 52 then demodulates and decodes the combined signal, at a decoding step 92. The method loops back to step 60 above.

The disclosed technique outperforms alternative possible implementations in which the compensation for differences in spectral response is performed by a filter in the demodulator. For example, an equalizing filter at the receiver demodulator will often cause noise enhancement, since the receiver noise passes via the filter, as well. In the disclosed techniques, the receiver noise is not filtered by the filter, and noise enhancement is therefore eliminated.

Example Modem Implementation

Figure 3:
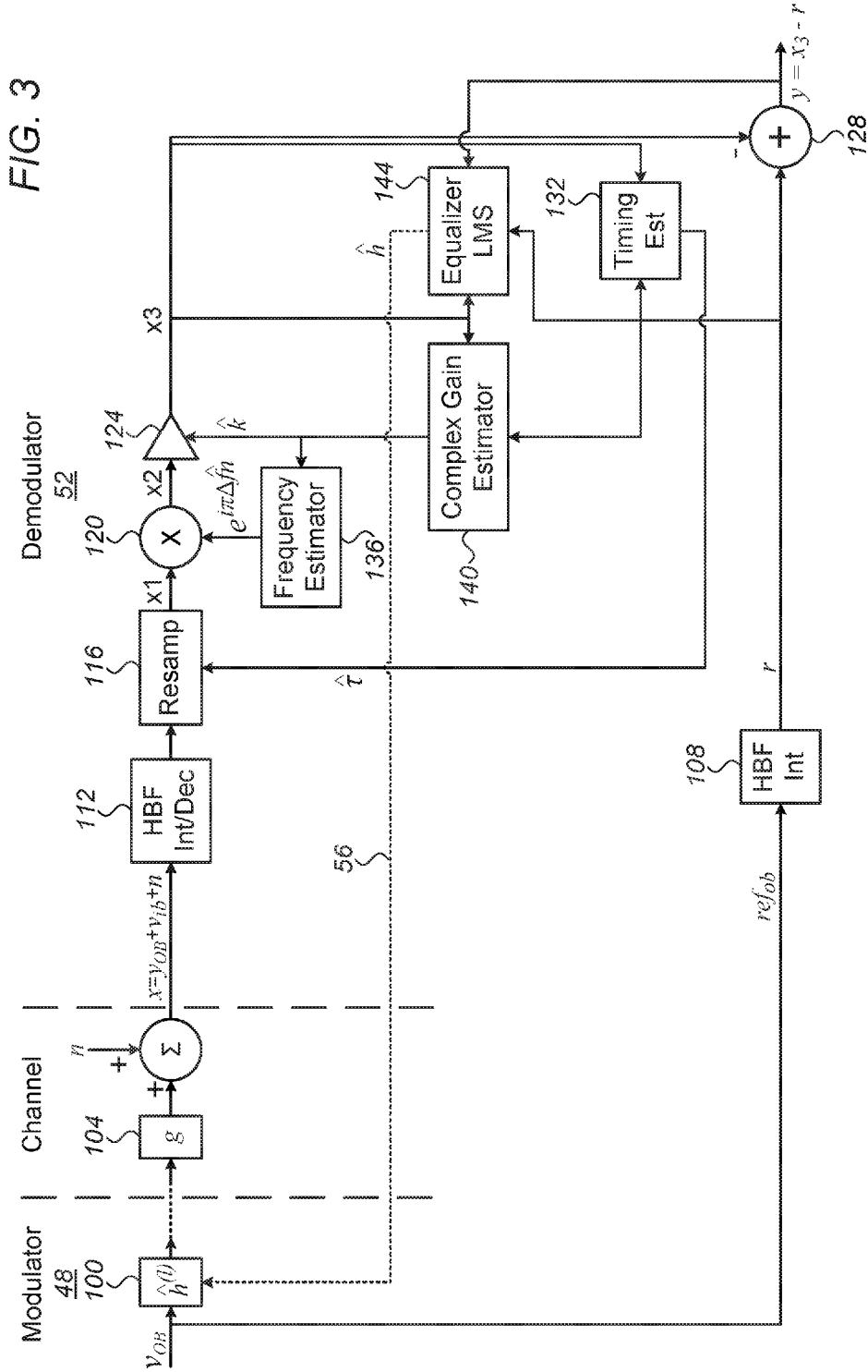
FIG. 3 is a block diagram that schematically illustrates the internal structure of a modem in a satellite communication hub, in accordance with an embodiment of the present invention.

FIG. 3 is a block diagram that schematically illustrates an example internal structure of modem 44 in hub 24 of system 20, in accordance with an embodiment of the present invention. In the description that follows, the outbound transmitted signal is denoted $v_{OB}$, the response of the transmitter-side filter is denoted $\hat{h}$, and the channel response is denoted g. The received desired inbound signal is denoted $v_{ib}$. The received undesired replica of the transmitted outbound signal is denoted $y_{OB}$ and is given by $y_{OB}=v_{OB}*\hat{h}*g$, wherein "*" denotes a convolution operation. The input noise is denoted n, and is typically assumed to be Gaussian.

All the variables above typically vary as a function of time, and the signals and channel and filter responses are represented in the time domain. The time dependence is not explicitly denoted in the equations below, for the sake of clarity.

In the embodiment of FIG. 3, modulator 48 pre-filters the transmitted signal $v_{OB}$ with a digital filter 100 whose coefficients are set to response $\hat{h}$. As noted above, filter 100 may comprise, for example, a FIR filter. In an example implementation, filter 100 may have thirty-two coefficients of ten bits each, and may operate at a rate of $36 \cdot 10^6$ samples per second. Such a filter is able to compensate for spectral-response differences over a bandwidth of 36 MHz. Alternatively, however, any other suitable filter can be used. In alternative embodiments, other filter configurations such as Infinite Impulse Response (IIR) may also be used.

Modulator 48 transmits the pre-filtered outbound signal using front end 40 to satellite 32. The transmitted signal traverses a channel 104 whose response is g. The channel response comprises both the round-trip propagation channel between hub 24 and satellite 32, as well as any distortion introduced into the outbound signal by modulator 48, front end 40 (in both directions), satellite 32 and demodulator 52. Following the channel response, noise n is added to the signal.

The received signal at demodulator 52 is thus given by $x=y_{OB}+v_{ib}+n$. As will be shown below, the undesired replica (echo) $y_{OB}$ of the transmitted signal is canceled using a delayed local copy of the transmitted signal, denoted $ref_{ob}$.

In the present example, received signal x is interpolated and/or decimated by a Half-Band Filter (HBF) interpolator/decimator 112, which sets the sampling rate of the received signal to the appropriate sampling rate for subsequent processing. A similar HBF interpolator/decimator 108 sets the sampling rate of the delayed local copy $ref_{ob}$. The re-sampled delayed local copy is denoted r.

The received signal x is re-sampled by an adaptive re-sampler 116 that adapts the timing (delay) of the signal. The re-sampled signal, denoted x1, is frequency-shifted and phase-shifted by an adaptive phase rotator 120. The frequency-shifted and phase-shifted signal, denoted x2, is amplified by a variable-gain amplifier 124 that adapts the gain (amplitude) of the signal. The adapted signal at the output of amplifier 124 is denoted x3. A combiner 128 combines the adapted signal x3 with the delayed local copy $re f_{ob}$, to produce an output signal $y=x3-r$, in which the undesired echo $y_{OB}$ is considerably reduced.

In the present embodiment, demodulator 52 comprises a timing estimation module 132 that adaptively estimates the timing correction to be set by re-sampler 116, a frequency estimation module 136 that estimates the frequency and phase correction to be applied by rotator 120, and a complex gain estimation module 140 that estimates the complex gain (denoted $\hat{k}$) to be applied by amplifier 124. In one embodiment, the phase component of the complex gain correction is applied by rotator 120 as part of the frequency correction, and the amplitude component of the complex gain correction is applied by amplifier 124. Modules 132, 136 and 140 estimate their respective corrections based on the adapted signal x3, and/or based on any other suitable signal in demodulator 52.

As can be seen in the figure, in the present example all the receiver-side adaptations are applied to the received signal x, while the delayed local copy r is not adapted (with a possible exception of a one-time setting of delay and gain).

In some embodiments, demodulator 52 further comprises a spectral response estimation module 144, also referred to as a Least Means Square (LMS) Equalizer. Module 144 estimates the filter response $\hat{h}$ that, when set in filter 100, compensates for the differences in spectral response between $y_{OB}$ and r across the signal bandwidth. Demodulator 52 transfers the estimated response $\hat{h}$ to modulator 48 over local interface 56. The filter response in the $l^{th}$ iteration is denoted $\hat{h}^{(l)}$.

Figure 4:
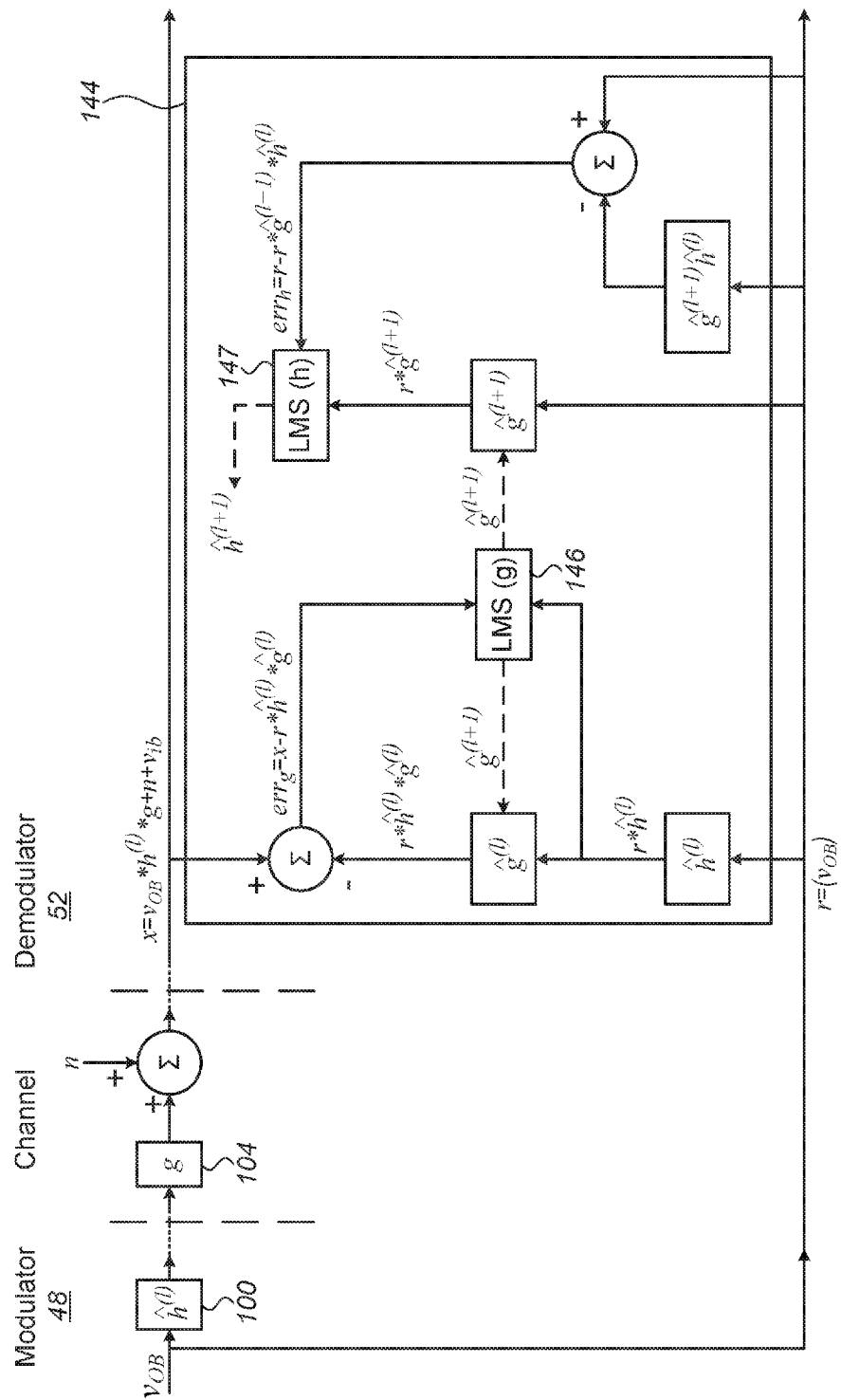
FIG. 4 is a block diagram that schematically illustrates a process of estimating a pre-compensation filter in a satellite communication hub, in accordance with an embodiment of the present invention.

FIG. 4 is a block diagram that schematically illustrates the process of estimating filter response h, as carried out by module 144, in accordance with an embodiment of the present invention. In the following description, the estimate of the channel response g is denoted $\hat{g}$, the difference between the received signal x and the estimate delayed copy is denoted $err_g$. As noted above, the reference signal is denoted r and is equal to $v_{OB}$ at the modulator.

Module 144 estimates filter response $\hat{h}$ using LMS equalization. The estimation process iteratively minimizes the expectation of the deviation of the actual received signal from the expected response of the reference signal. In other words, module 144 carries out an iterative adaptation process that aims to find the filter response $\hat{h}$ that minimizes the expression $$E[|x-r*\hat{h}*\hat{g}|^2]$$

In an embodiment, a channel estimation block 146 in module 144 first estimates $\hat{g}$, the estimate of the channel response g within the bandwidth of the outbound signal $v_{OB}$, using LMS. Based on the estimated channel response $\hat{g}$, a filter estimation response block 147 in module 144 estimates filter response $\hat{h}$ using LMS.

In an embodiment, block 146 in module 144 calculates the estimate of $\hat{g}$ at the $l^{th}$ iteration by differentiating the error signal $err_g$ with respect to $\hat{g}$, and using a steepest-descent process with step size $\mu$:

$$\underline{\hat{g}}^{(l+1)} = \underline{\hat{g}}^{(l)} + \mu \frac{1}{M} \sum_{i=1}^{M} \left( x_i - \underline{r_i} * \underline{\hat{h}}^{(l)} * \underline{\hat{g}}^{(l)} \right) \left( \underline{r_i} * \underline{\hat{h}}^{(l)} \right)^*$$

In an embodiment, using the above estimation of $\hat{g}$, block 147 in module 144 calculates the estimate of the filter response $\hat{h}$ as an approximation of the inverse of $\hat{g}$. In an embodiment, module 144 carries out an iterative LMS process that minimizes the deviation $err_h = r - r * \hat{g}^{(l+1)} * \hat{h}^{(l)}$.

$$\underline{\hat{h}}^{(l+1)} = \underline{\hat{h}}^{(l)} + \mu \frac{1}{M} \sum_{i=1}^{M} (r_i - x_i) \left( \underline{r_i} * \underline{\hat{g}}^{(l+1)} \right)^*$$

The modem implementation shown in FIGS. 3 and 4 is an example implementation, which is depicted purely for the sake of conceptual clarity. In alternative embodiments, the disclosed techniques can be implemented in any other suitable manner. For example, in the embodiment of FIGS. 2-4 above, all the receiver-side adaptations (e.g., in timing, frequency and complex gain) are applied to the received signal x, while the delayed local copy r is not adapted. In alternative embodiments, one or more of these adaptations (e.g., timing, frequency and complex gain) may be applied to the delayed local copy r.

As another example, in the embodiment of FIGS. 3 and 4 demodulator 52 estimates the actual filter response $\hat{h}$ and transfers this estimate to modulator 48. In alternative embodiments, demodulator 52 may estimate and transfer to modulator 48 a correction to the filter response, relative to the existing filter response that is currently set in filter 100.

As yet another example, in the embodiments described herein, the transmitter-side pre-filtering schemes compensate for linear distortion—For differences in the linear channel response or transfer function between the received undesired replica of the transmitted signal and the delayed local copy of the transmitted signal. In alternative embodiments, a similar transmitter-side pre-filtering scheme may be used for compensating for non-linear differences between the received undesired replica of the transmitted signal and the delayed local copy of the transmitted signal.

In some embodiments, the transmitted outbound signal and the inbound signal received from terminal 36 have similar bandwidths. In alternative embodiments, e.g., when hub 24 serves multiple terminals 36, the outbound signal may have a considerably larger bandwidth than any individual inbound signal. In such embodiments, the interference cancellation scheme described herein may be applied separately within the bandwidth of each individual inbound signal, for canceling a respective portion of the echo that falls within this bandwidth. For example, hub 24 may comprise multiple separate demodulators 52 for the respective inbound signals, each demodulator provided with the appropriate spectral slice of the received signal. In some embodiments, each of the demodulators is provided with the appropriate signals for performing its own cancellation process.

The system, hub and circuitry configurations shown in FIGS. 1, 3 and 4 are example configurations, which are chosen purely for the sake of conceptual clarity. In alternative embodiments, any other suitable configurations can be used. Elements that are not mandatory for understanding of the disclosed techniques have been omitted from the figure for the sake of clarity.

The elements of system 20, e.g., elements of hub 24, including the various modules of modulator 48 and demodulator 52, can be implemented using hardware, such as in one or more Radio Frequency Integrated Circuits (RFICs), Application-Specific Integrated Circuits (ASICs) and/or Field-Programmable Gate Arrays (FPGAs). Alternatively, some elements the system or hub may be implemented is software, or using a combination of hardware and software elements.

Certain elements of hub 24, e.g., parts of modem 44, may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Example Simulation Results

FIGS. 5A-5D are graphs showing example simulation results of the disclosed echo cancellation process, in accordance with an embodiment of the present invention. The simulation was performed using the following assumptions and parameters:

The outbound and inbound signals have the same bandwidth and center frequency.

The received signal x and the local copy r are given at a sampling rate of two samples per symbol.

No timing errors are assumed.

The inbound signal is 10 dB stronger than the outbound signal.

The outbound signal to noise ratio is 10 dB.

The channel response g has a magnitude response having a positive linear slope, i.e., increases linearly across the signal bandwidth. The variation in channel gain between the band edges is 10 dB.

These assumptions and parameters were chosen by way of example, in order to demonstrate the disclosed techniques. In alternative embodiments, any other suitable assumptions and parameters can be used.

Figure 5B:
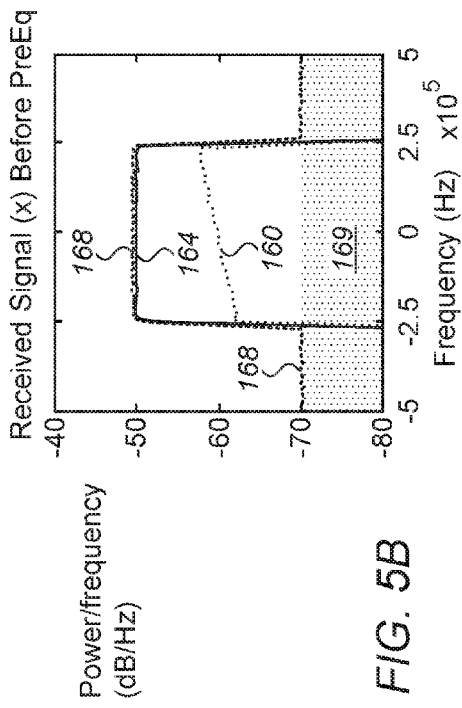
FIGS. 5A-5D are graphs showing simulation results of a process for echo cancellation using transmitter-side pre-filtering, in accordance with an embodiment of the present invention.
Figure 5D:
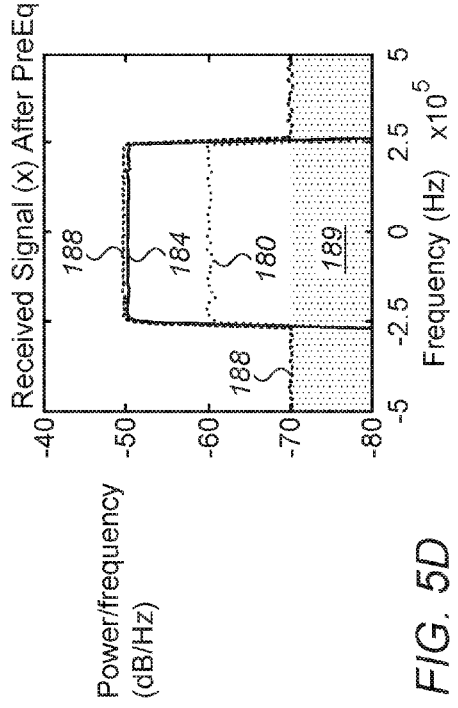
Figure 5A:
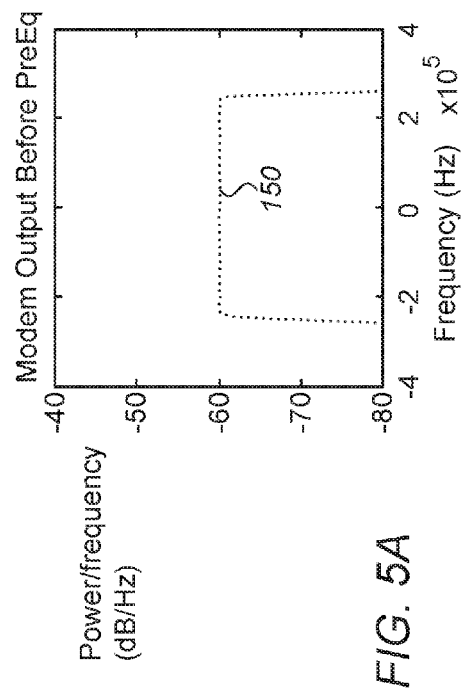

In FIG. 5A, a curve 150 shows the spectrum of the outbound signal at the output of modulator 48, without (or before) pre-filtering. As can be seen in the figure, without pre-filtering the outbound signal has a substantially flat response across its bandwidth.

FIG. 5B shows the spectra of the signals making-up the received signal x, as they are received at hub 24, without (or before) pre-filtering. A curve 160 shows the spectrum of $y_{OB}$, the undesired replica of the outbound signal. A curve 164 shows the spectrum of $v_{ib}$, the inbound signal that was retransmitted by satellite 32. A curve 168 shows the spectrum of the composite signal x. A dotted region 169 shows the spectrum of the receiver noise n.

As can be seen in FIG. 5B, when no pre-filtering is carried out, the spectrum of $y_{OB}$ has the same positive slope as the channel response g. As such, combining $y_{OB}$ with $v_{ib}$ would yield poor echo cancellation, if any.

Figure 5C:
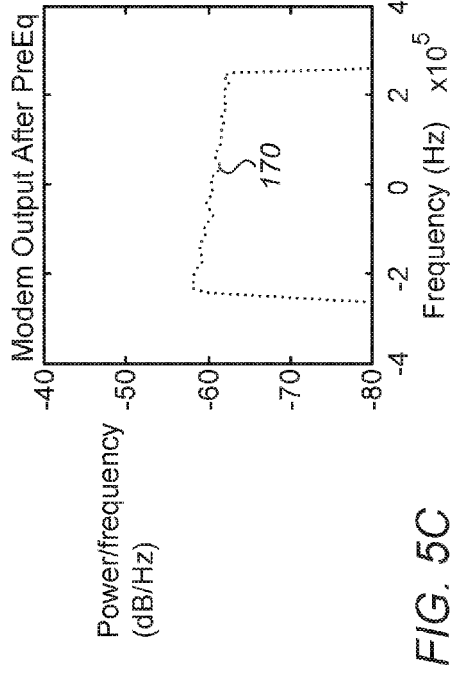

In FIG. 5C, a curve 170 shows the spectrum of the outbound signal at the output of modulator 48, with transmitter-side pre-filtering in accordance with the disclosed techniques. As can be seen in the figure, the pre-filtered outbound signal has a negative slope in the frequency domain, which compensates for the positive slope of the channel response g.

FIG. 5D shows the spectra of the signals making-up the received signal x, as they are received at hub 24, with transmitter-side pre-filtering in accordance with the disclosed techniques. A curve 180 shows the spectrum of $y_{OB}$, the undesired replica of the outbound signal. A curve 184 shows the spectrum of $v_{ib}$, the inbound signal that was retransmitted by satellite 32. A curve 188 shows the spectrum of the composite signal x. A dotted region 189 shows the spectrum of the receiver noise n.

As can be seen in FIG. 5D, when modem 44 applies transmitter-side pre-filtering, the spectrum of $y_{OB}$ (curve 180) is pre-compensated to remove the slope of the channel response g. Therefore, the spectra of $y_{OB}$ and $v_{ib}$ (curves 180 and 184, respectively) are well matched across the entire signal bandwidth (up to a broadband frequency-independent gain difference that is corrected in the demodulator). With such pre-filtering, combining $y_{OB}$ with $v_{ib}$ provides deep echo cancellation.

Additional simulation results are given in U.S. Provisional Patent Application 62/103,109, cited above. For example, the simulation shows that the echo cancellation process reaches a depth of approximately 30 dB.

Although the embodiments described herein mainly address echo cancellation in satellite communication systems, the methods and systems described herein can also be used in other applications that cope with echoes of transmitted signals, such as in a Time Division Duplex (TDD) transceiver in which the guard time between transmission and reception time intervals is not sufficiently long, for canceling clutter in radar systems, for reducing reverberations in audio systems, or in any other suitable application.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a transceiver, receiving from a repeater a received signal, which comprises a desired signal for reception and an undesired replica of a transmitted signal that was transmitted from the transceiver and retransmitted by the repeater;
   generating in the transceiver a local copy of the transmitted signal;
   estimating in the transceiver a filter response that, when applied to the transmitted signal before transmission, compensates for a difference in spectral response between (i) the local copy of the transmitted signal and (ii) the undesired replica of the transmitted signal, wherein estimating the filter response comprises estimating frequency-dependent variations in phase and gain between the local copy of the transmitted signal and the undesired replica of the transmitted signal, across a given bandwidth;
   matching the undesired replica of the transmitted signal, which is received in the received signal, with the local copy of the transmitted signal, by at least pre-filtering the transmitted signal before transmission with the estimated filter response; and
   canceling an interference caused by the undesired replica to the desired signal, by combining the local copy and the received signal.

2. The method according to claim 1, wherein the repeater comprises a satellite.

3. The method according to claim 1, wherein estimating the filter response comprises running an iterative Least Means Square (LMS) process that converges to the filter response.

4. The method according to claim 1, wherein estimation of the filter response is performed in a demodulator of the transceiver, wherein pre-filtering the transmitted signal with the estimated filter response is performed in a modulator of the transceiver, and comprising transferring the estimated filter response from the demodulator to the modulator over a local interface in the transceiver.

5. The method according to claim 1, wherein matching the undesired replica with the local copy further comprises compensating for one or more impairments selected from a group of impairments consisting of:
   a timing offset between the received signal and the local copy of the transmitted signal;
   a frequency offset between the received signal and the local copy of the transmitted signal;
   a frequency-independent gain difference between the received signal and the local copy of the transmitted signal; and
   a frequency-independent phase difference between the received signal and the local copy of the transmitted signal.

6. The method according to claim 5, wherein compensating for the impairments comprises correcting at least one of the impairments by adapting the received signal.

7. The method according to claim 5, wherein compensating for the impairments comprises correcting at least one of the impairments by adapting the local copy of the transmitted signal.

8. The method according to claim 5, wherein compensating for the impairments is performed without adapting the local copy of the transmitted signal.

9. The method according to claim 1, wherein the received signal and the transmitted signal occupy overlapping spectra.

10. A communication transceiver, comprising:
    a front end, which is configured to exchange signals with a repeater; and
    a modem, which is configured to:
    receive from the repeater a received signal, which comprises a desired signal for reception and an undesired replica of a transmitted signal that was transmitted from the transceiver and retransmitted by the repeater;
    generate a local copy of the transmitted signal;
    estimate a filter response that, when applied to the transmitted signal before transmission, compensates for a difference in spectral response between (i) the local copy of the transmitted signal and (ii) the undesired replica of the transmitted signal, by estimating frequency-dependent variations in phase and gain between the local copy of the transmitted signal and the undesired replica of the transmitted signal, across a given bandwidth;

match the undesired replica of the transmitted signal, which is received in the received signal, with the local copy of the transmitted signal, by at least pre-filtering the transmitted signal before transmission with the estimated filter response; and cancel an interference caused by the undesired replica to the desired signal, by combining the local copy and the received signal.

11. The transceiver according to claim 10, wherein the repeater comprises a satellite.

12. The transceiver according to claim 10, wherein the modem is configured to estimate the filter response by running an iterative Least Means Square (LMS) process that converges to the filter response.

13. The transceiver according to claim 10, wherein the modem comprises a demodulator configured to estimate the filter response, a modulator configured to pre-filter the transmitted signal with the estimated filter response, and a local interface configured to transfer the estimated filter response from the demodulator to the modulator.

14. The transceiver according to claim 10, wherein the modem is configured to match the undesired replica with the local copy further by compensating for one or more impairments selected from a group of impairments consisting of:

a timing offset between the received signal and the local copy of the transmitted signal;

a frequency offset between the received signal and the local copy of the transmitted signal;

a frequency-independent gain difference between the received signal and the local copy of the transmitted signal; and a frequency-independent phase difference between the received signal and the local copy of the transmitted signal.

15. The transceiver according to claim 14, wherein the modem is configured to compensate for at least one of the impairments by adapting the received signal.

16. The transceiver according to claim 14, wherein the modem is configured to compensate for at least one of the impairments by adapting the local copy of the transmitted signal.

17. The transceiver according to claim 14, wherein the modem is configured to compensate for the impairments without adapting the local copy of the transmitted signal.

18. The transceiver according to claim 10, wherein the received signal and the transmitted signal occupy overlapping spectra.

* * * * *